Aug. 9, 1938.　　　W. COWEN　　　2,126,311
EXTENSION HANDLE FLY SWATTER
Filed June 15, 1937
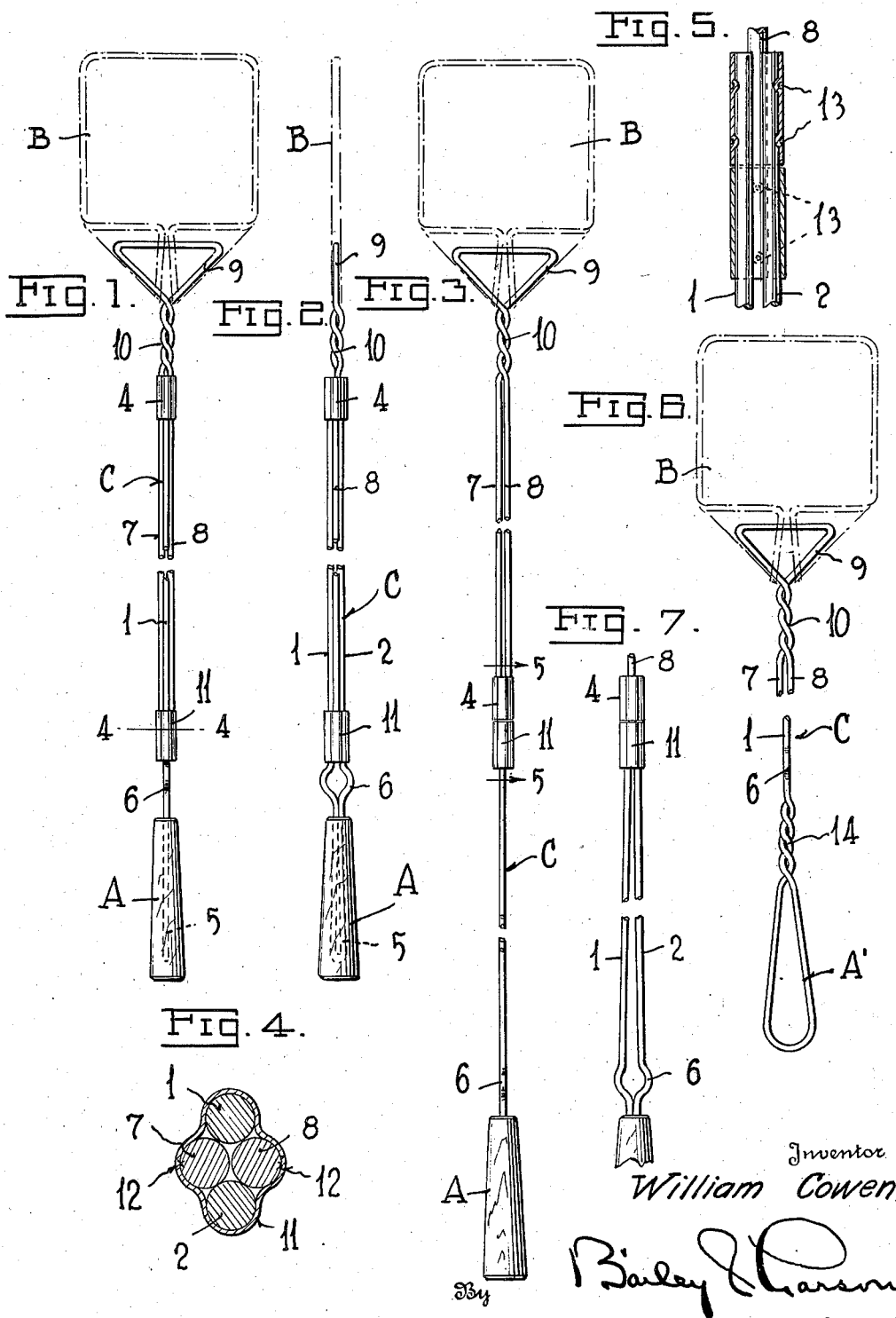
Inventor
William Cowen,
By Bailey & Carson
Attorneys Patented Aug. 9, 1938

2,126,311

UNITED STATES PATENT OFFICE 2,126,311

EXTENSION HANDLE FLY SWATTER

William Cowen, Brooklyn, N. Y.

Application June 15, 1937, Serial No. 148,406

15 Claims. (Cl. 43—137)

This invention relates to a new and useful improvement in an extension handle for use in fly swatters and other articles. While extensible handles for fly swatters and the like are known in the prior art, these handles were neither practical nor satisfactory for a number of reasons. Primarily the handles were made of such construction that they were very weak in either partially or fully extended position, and, furthermore, they were subject to jamming when extending or retracting the handle and therefore did not operate properly. This was especially true because in extended position the center of the extended handle was especially weak so that in the use of the handle the extended strands or tubes would become warped or distorted because of the weakness of the extended length of the handle and therefore the handle could not be readily extended or retracted thereafter.

Thus, it is an object of my invention to make an extensible handle which is reinforced in its center section in any extended position, and particularly in fully extended position.

It is a further object of my invention to make an extensible handle that may be readily and easily extended so that flies or other insects at high, inaccessivle points may be reached by merely extending the handle.

Another object of my invention is to provide an extensible handle, which, in its extended position, will have degrees of flexibility in two or more different directions so that a proper whipping action of the same may be obtained without injurious warping or distortion of the handle.

It is a still further object of my invention to provide an extensible handle that can be cheaply and efficiently made of stock such as wire rods which can be fitted together to make a construction which provides the necessary strength and flexibility and yet allows an extension and retraction of the device without undue frictional contact between the various members.

These objects I obtain generally by forming my extensible handle of two parts, each part consisting of parallel pieces of wire. These pieces of wire are set at right angles to each other and are held in telescopic engagement by means of sleeves or bands. It is readily apparent that by such a construction the bands will lie at the center of the extended handle and will, in conjunction with the overlapping wires at the center of the handle, form a very strong construction. Flexibility is obtained by having the pairs of wires set in planes at right angles to one another.

A structure by which these and other objects of my invention may be obtained will be apparent by reference to the accompanying sheet of drawings, in which Fig. 1 is a plan view of my swatter in retracted position.

Fig. 2 is a side view of Fig. 1.

Fig. 3 is a plan view of the fly swatter in extended position.

Fig. 4 is a cross-sectional view on the line 4—4 of Fig. 1.

Fig. 5 is a cross-sectional view on the line 5—5 of Fig. 3.

Fig. 6 is a modification of Fig. 1 in the showing of the hand-grip means, and

Fig. 7 is a detailed view of the lower part of Fig. 2.

As shown in Figs. 1, 2, and 3, the fly swatter is provided with a hand-grip A, formed of wood or other suitable material, a blade or swatter B of wire screen or of rubber or other suitable material, said hand-grip and blade being connected by means of pieces of wire noted generally by C, which wires form the major part of my invention. These wires are formed in two pairs, the first pair consisting of wires 1 and 2 spaced apart in a vertical plane and secured at one end within the grip A and at the other end by a bracket or sleeve 4. For simplicity of manufacture these wires 1 and 2 are formed from a single length of wire bent in its middle at 5, which bent portion is placed within the handle A. Immediately adjacent the handle A the two wires are bent apart as indicated at 6 for a purpose which will be described later. The free ends of the wires are fastened together by means of the sleeve or clamp 4. Between the enlarged portion 6 and the sleeve 4 the wires are convergent toward one another, being spaced but at their least distance apart at the sleeve 4.

The second pair of wires, consisting of wires 7 and 8, are formed in a somewhat similar manner. In other words, a length of wire is bent at its center section to form a triangular element 9 which is adapted to support the blade B in the usual manner. At the apex of this triangular form, the wire is twisted or otherwise secured at 10 in order to fix the triangular section and to cause the extended arms 7 and 8 to lie in either contacting or closely spaced relation to each other. The free ends of arms 7 and 8 are secured to one another by means of a sleeve 11 which is very similar to the sleeve 4. The particular relationship of these two pairs of wires to each other is very readily seen by reference to Fig. 4 wherein it is shown that wires 1 and 2 attached to handle A are spaced apart, and that wires 7 and 8, attached to the blade, are either contacting or slightly spaced apart. From this it is seen that wires 1 and 2 contact wires 7 and 8 tangentially, and that wires 1 and 2 lie in a vertical plane whereas wires 7 and 8 lie in a horizontal plane. By reason of this construction, when the fly swatter is in the position shown in Fig. 3, the wires 1 and 2 will allow flexibility in one direction, whereas the wires 7 and 8 will allow flexibility in a plane at right angles to wires 1 and 2.

It is also seen that the sleeve 11 of Fig. 4 is secured to wires 7 and 8 by means such as welds 12. Instead of using welds 12, dents or depressions 13, such as shown in Fig. 5, may be alternatively used. The sleeve 11 is secured to rods 7 and 8, but embraces wires 1 and 2. In a reverse manner, the sleeve 4 is secured to rods 1 and 2 and embraces rods 7 and 8. The length of the rods from the ends of the sleeves to either the enlargement 6 or to the twisted portion 10 is approximately equal so that in retracted position the sleeve 11 will frictionally engage the enlargement 6 to hold the wires in their retracted position, as clearly shown in Fig. 2.

Preferably sleeves 4 and 11 are similar in size and shape, and consist of tubular elements formed of metal, and shaped as shown so as to be secured to one pair of wires and to contact slidably the other pair of wires. While the length of the sleeves as shown has the advantage of preventing warping of the wires with respect to each other, it is obvious that any means which will telescopically hold the pairs of wires together will serve the primary purposes of my invention.

As the handle is extended sleeves 4 and 11 are moved toward each other and finally contact each other at the center of the extended handle. Thus at the center section there are four wires which extend the length of the two sleeves and the four wires are reinforced by the two sleeves, which makes a very strong center section for the handle. Furthermore, because of the converging nature of the wires 1 and 2 toward sleeve 4, as the handle is placed in any position intermediate the positions of Figs. 1 and 3, a frictional engagement of the wires 1 and 2 is obtained against the sleeve 11 and aids in maintaining the sleeve in any intermediate position. Again at the center section of the handle, when the handle is in extended position, the wires 1 and 2 become so constricted as to bind upon the wires 7 and 8 where contained within sleeve 11, that a frictional engagement is produced to hold the handle in extended position. Because sleeve 4 lies between sleeve 11 and twist 10, the wires cannot be separated unless a sleeve is removed or destroyed. The frictional engagements are very desirable because of the fact that the length of the handle would otherwise be subject to change due to centrifugal force in swinging said handle toward an insect. As the wires 1 and 2 lie in one plane, and the wires 7 and 8 lie in another plane, a double resiliency of the handle is obtained.

Fig. 6 shows a modification of the hand-grip means shown in Fig. 1. Instead of a wooden or composition grip as shown at A in Fig. 1, a handle may be formed of a wire rod itself. As shown adjacent the enlargement 6, between the wires 1 and 2, the wires are twisted or otherwise secured at 14 and the hand-grip is formed by a loop portion A'. It should be particularly noted that it is preferable to form this loop portion so that it lies in the same plane as the triangular loop 9 which holds the blade B. This provides a very easily formed and readily managed hand-hold for my extensible handle. As shown in Figs. 3 and 6, both forms of the invention are preferably constructed with the wires 7 and 8 lying in the same plane as the loop 9, and therefore the same plane as the blade B. This creates the advantage of having that part of the extended handle toward the blade B more flexible than the portion near the hand grip. Accordingly, a good swinging action is obtained when the invention is used with a fly swatter, as the handle is relatively rigid in the direction of swing near the hand grip, and relatively flexible near the blade. Another advantage is obtained with the structure of Fig. 6 because the hand grip A' is in the same plane as wires 7, 8 and blade B, thus enabling the handle to be more effectively held with regard to the direction of swing.

While I have herein shown structures capable of carrying out the objects of my invention, they are described for purposes of illustration only, and the invention is limited only by the following claims.

I claim:
1. An extensible handle comprising two sections each including two substantially parallel members, each pair of members lying in a plane at right angles to the other pair, and means holding said pairs of members in telescopic engagement with each other, and each pair of members, when acting as an entity, having its major plane of resiliency in a direction other than the major plane of resiliency of the other pair of members when acting as an entity.

2. An extensible handle comprising a pair of spaced wires lying in one plane, a second pair of wires substantially contacting each other lying in another plane, the wires of the second pair of wires having therebetween a smaller space than the space between said first pair of wires, and means to secure said pairs of wires telescopically and tangentially together.

3. An extensible handle comprising pairs of wires each formed by rebent lengths of wire, the free ends of each pair of wires being secured together by means of tubular sleeves, each sleeve having pairs of grooves conforming respectively to said wires, and each pair of wires being slidably engaged within the sleeve securing the other pair of wires.

4. An extensible handle comprising two separate pairs of wires lying in intersecting planes, and means to hold said pairs in telescopic engagement with each other, each pair of wires, when acting as an entity, having its major plane of resiliency in a direction other than the major plane of resiliency of the other pair of wires when acting as an entity.

5. An extensible handle comprising a plurality of telescopically engaged members lying in intersecting planes, each of said members consisting of associated elements, the associated elements of one of said members when acting as an entity having its major plane of resiliency in a direction other than the major plane of resiliency of the associated elements of another member when acting as an entity.

6. A flyswatter composed of a hand-grip, a blade and an extensible handle connecting said grip and said blade, said handle comprising telescopically engaged members lying in intersecting planes, each of said members consisting of associated elements, the associated elements of one of said members when acting as an entity having its major plane of resiliency in a direction other than the major plane of resiliency of the associated elements of another member when acting as an entity, one of said members being flexible in the direction of flexibility of the blade, another member being flexible normal to said blade flexibility, and means holding said members in telescopic engagement with each other.

7. A flyswatter as in claim 6, each member consisting of a pair of rods parallel to each other, and sleeve means secured to one pair and slidable upon the other pair of rods.

8. A flyswatter composed of a hand-grip, an extensible handle, and a swatter element, said handle comprising pairs of parallel rods, one of said pairs being secured to said grip and extending toward said element, another pair of rods being secured to said element and extending toward said grip, each of said pairs having a plane of flexibility normal to the plane of flexibility of another pair, and sleeve means fixed upon each pair and slidable upon another pair.

9. A flyswatter as in claim 8, said pair attached to said grip being spaced apart and having an enlarged portion adjacent said grips adapted to be a frictional stop for one of said sleeve means.

10. A flyswatter as in claim 8, said pair attached to said grip tapering convergently from said grip toward said sleeve means fixed upon said pair.

11. A flyswatter as in claim 8, one of said pairs of rods being arranged in substantially contacting relation, the rods of another of said pairs being spaced apart so as to engage tangentially said contacting rods, and the rods arranged in substantially contacting relation having therebetween a smaller space than said spaced apart rods.

12. A flyswatter composed of a hand-grip, an extensible handle, and a swatter element, a pair of parallel rods attached to said handle, a second pair of parallel rods attached to said element, said pairs of rods being slidable upon each other and arranged in planes substantially normal to each other, a tubular sleeve fixed upon each pair of rods and slidable upon the other pair of rods, each sleeve contacting the other sleeve in abutting relation when said handle is in extended position to reinforce the center section of said handle.

13. An extensible handle comprising a first pair of wires of circular section spaced from each other, a second pair of similar sectioned wires substantially contacting each other and together forming a groove on each side of the contacting wires, the wires of said second pair having therebetween a space smaller than the space between said wires of said first pair, each wire of said first pair of wires lying in one of said grooves and tangentially contacting said second pair of wires, and grooved tubular sleeve means securing said pairs of wires telescopically and tangentially together.

14. An extensible handle comprising a first pair of rod members, a second pair of rod members and a pair of tubular sleeve members, one of said sleeve members securing the ends of said first pair of members in spaced apart relation and having grooves for the slidable reception of the second of said rod members, the other sleeve member securing the ends of said second pair of rod members into substantially contacting relation and having grooves for the slidable reception of the first of said rod members, the rod members of said second pair having therebetween a space smaller than the space between the rod members of said first pair, and said rod members being in telescopic engagement with each other.

15. An extensible handle comprising two separate pairs of wires, means to hold said pairs in telescopic engagement with each other, one of said pairs lying in a first plane and having its major resiliency in one direction and being adapted to support a blade member, and the other of said pairs lying in a second plane and having its major resiliency in another direction and supporting a substantially U-shaped wire hand grip element, said element lying in said first plane.

WILLIAM COWEN.